United States Patent
Kim et al.

(10) Patent No.: US 11,921,549 B2
(45) Date of Patent: Mar. 5, 2024

(54) DISPLAY DEVICE

(71) Applicant: LG ELECTRONICS INC., Seoul (KR)

(72) Inventors: Dohyeon Kim, Seoul (KR); Brian Chung, Seoul (KR); Sangdon Park, Seoul (KR); Yongnam Park, Seoul (KR); Dongha Yang, Seoul (KR); Jinha Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/291,731

(22) PCT Filed: Jan. 25, 2019

(86) PCT No.: PCT/KR2019/001072
§ 371 (c)(1),
(2) Date: May 6, 2021

(87) PCT Pub. No.: WO2020/153517
PCT Pub. Date: Jul. 30, 2020

(65) Prior Publication Data
US 2022/0011826 A1     Jan. 13, 2022

(51) Int. Cl.
*G06F 1/16* (2006.01)

(52) U.S. Cl.
CPC .......... *G06F 1/1681* (2013.01); *G06F 1/1656* (2013.01)

(58) Field of Classification Search
CPC .... G06F 1/1681; G06F 1/1656; G06F 1/1601; G06F 3/14; G02F 1/1333; G09F 9/302
See application file for complete search history.

(56) References Cited

U.S. PATENT DOCUMENTS 6,561,600 B1 *  5/2003  Seeley ................ B60R 11/0235
                                               312/257.1
8,369,103 B2 *  2/2013  Mitsuhashi ............... G09F 9/33
                                               361/679.04
(Continued)

FOREIGN PATENT DOCUMENTS

CN      106382444      2/2017
JP      2009162972     7/2009
(Continued)

OTHER PUBLICATIONS

PCT International Application No. PCT/KR2019/001072, International Search Report dated Oct. 24, 2019, 3 pages.

*Primary Examiner* — Imani N Hayman
*Assistant Examiner* — Theron S Milliser
(74) *Attorney, Agent, or Firm* — LEE, HONG, DEGERMAN, KANG & WAIMEY

(57) ABSTRACT

The present invention relates to a display device. A display device according to an embodiment of the present invention may comprise: a display module; a support frame disposed at the rear of the display module; and a hinge module hingedly connecting the display module to the support frame. The hinge module may comprise: a first fastening part fastened to the display module; a first body part connected to the first fastening part and protruding further rearward than the first fastening part; an insertion part protruding downward from the first body part; a second fastening part fastened to the support frame; a second body part connected to the second fastening part and protruding forward from the second fastening part; a first insertion groove recessed downward from the upper surface of the second body part and into which the insertion part is rotatably fitted; a second insertion groove which is in communication with the first insertion groove and is located (Continued)

on a side of the first insertion groove, and into which the insertion part is rotatably fitted.

20 Claims, 16 Drawing Sheets

(56) References Cited

U.S. PATENT DOCUMENTS

| | | | |
|---|---|---|---|
| 8,944,393 B2* | 2/2015 | Mitsuhashi | G09F 7/18 361/679.04 |
| 9,605,793 B2* | 3/2017 | Shibata | H05K 7/20963 |
| 9,727,080 B2* | 8/2017 | Jung | G06F 1/1652 |
| 10,004,151 B2* | 6/2018 | Jung | G06F 1/1601 |
| 10,104,789 B2* | 10/2018 | Shibata | F16M 11/045 |
| 10,485,113 B2* | 11/2019 | Dunn | G02F 1/133382 |
| 10,499,516 B2* | 12/2019 | Dunn | H05K 5/0226 |
| 10,624,218 B2* | 4/2020 | Dunn | G09F 13/0413 |
| 10,716,224 B2* | 7/2020 | Dunn | G09F 9/30 |
| 10,798,830 B2* | 10/2020 | Hwang | E05B 47/004 |
| 10,881,010 B2* | 12/2020 | Kim | H05K 5/0017 |
| 10,925,174 B2* | 2/2021 | Dunn | H05K 7/20972 |
| 11,032,923 B2* | 6/2021 | Dunn | H05K 7/1488 |
| 11,430,352 B2* | 8/2022 | Su | G09F 9/301 |
| 2007/0000849 A1* | 1/2007 | Lutz | G09F 9/33 211/26 |
| 2008/0100186 A1 | 5/2008 | Li | |
| 2008/0304219 A1* | 12/2008 | Chen | G09F 9/33 361/829 |
| 2009/0009041 A1* | 1/2009 | Zeidler | A63F 13/98 312/263 |
| 2011/0228504 A1* | 9/2011 | Mitsuhashi | F16M 13/02 361/807 |
| 2011/0315837 A1* | 12/2011 | Mitsuhashi | G09F 9/3026 29/525.02 |
| 2015/0192952 A1* | 7/2015 | Jung | G06F 1/1601 361/747 |
| 2015/0276120 A1* | 10/2015 | Shibata | F16M 11/046 361/679.01 |
| 2016/0010836 A1* | 1/2016 | Patterson | G09F 9/33 40/541 |
| 2017/0105293 A1* | 4/2017 | Kim | H05K 5/0021 |
| 2017/0181296 A1* | 6/2017 | Shibata | F16M 11/06 |
| 2017/0295655 A1* | 10/2017 | Jung | G06F 1/20 |
| 2018/0112815 A1* | 4/2018 | Kim | G06F 1/1601 |
| 2018/0314103 A1* | 11/2018 | Dunn | H05K 7/20736 |
| 2018/0315356 A1* | 11/2018 | Dunn | H05K 5/0247 |
| 2018/0317330 A1* | 11/2018 | Dunn | H05K 7/20736 |
| 2019/0239365 A1* | 8/2019 | Dunn | H05K 7/20736 |
| 2020/0015370 A1* | 1/2020 | Kim | H05K 5/0204 |
| 2020/0068726 A1* | 2/2020 | Hwang | H05K 5/0221 |
| 2020/0205303 A1* | 6/2020 | Dunn | H05K 7/20954 |
| 2020/0288585 A1* | 9/2020 | Dunn | H05K 5/0247 |
| 2021/0168949 A1* | 6/2021 | Dunn | G02F 1/133385 |
| 2022/0035198 A1* | 2/2022 | Dunn | H05K 7/20972 |
| 2022/0058988 A1* | 2/2022 | Su | G09F 9/3026 |

FOREIGN PATENT DOCUMENTS

| | | |
|---|---|---|
| KR | 100985223 | 10/2010 |
| KR | 200451370 | 12/2010 |

* cited by examiner

[Fig. 1]
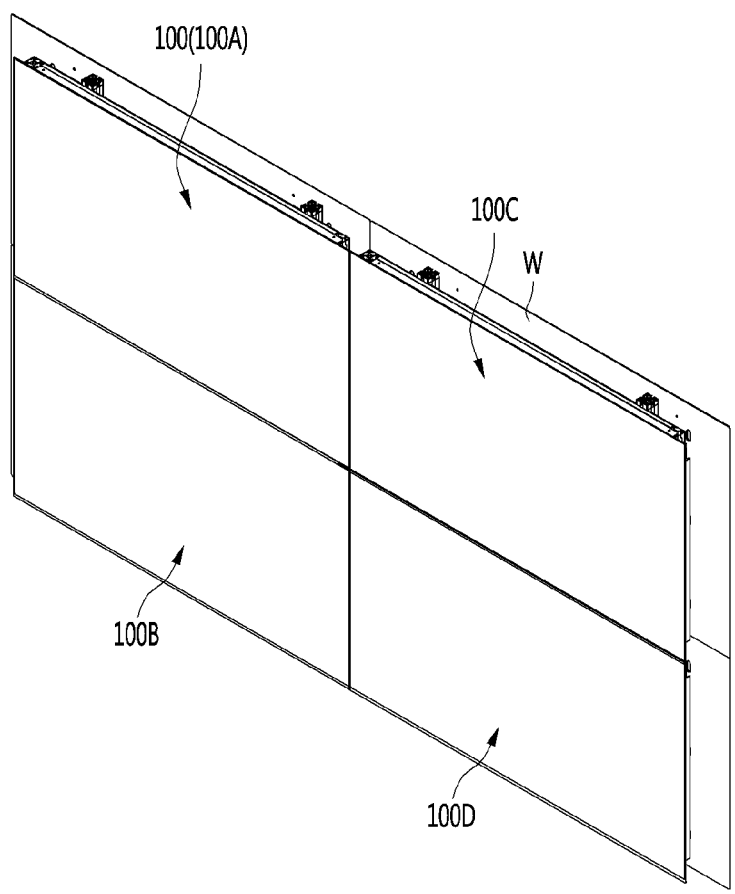

[Fig. 2]
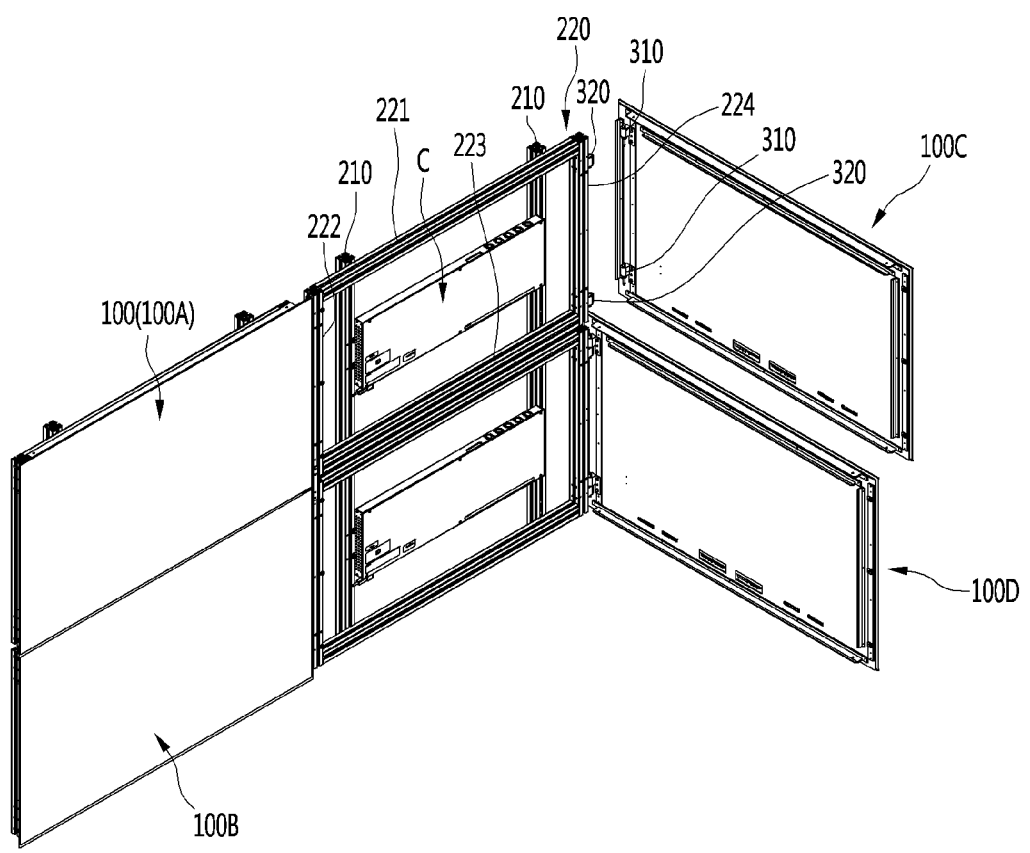

[Fig. 3]
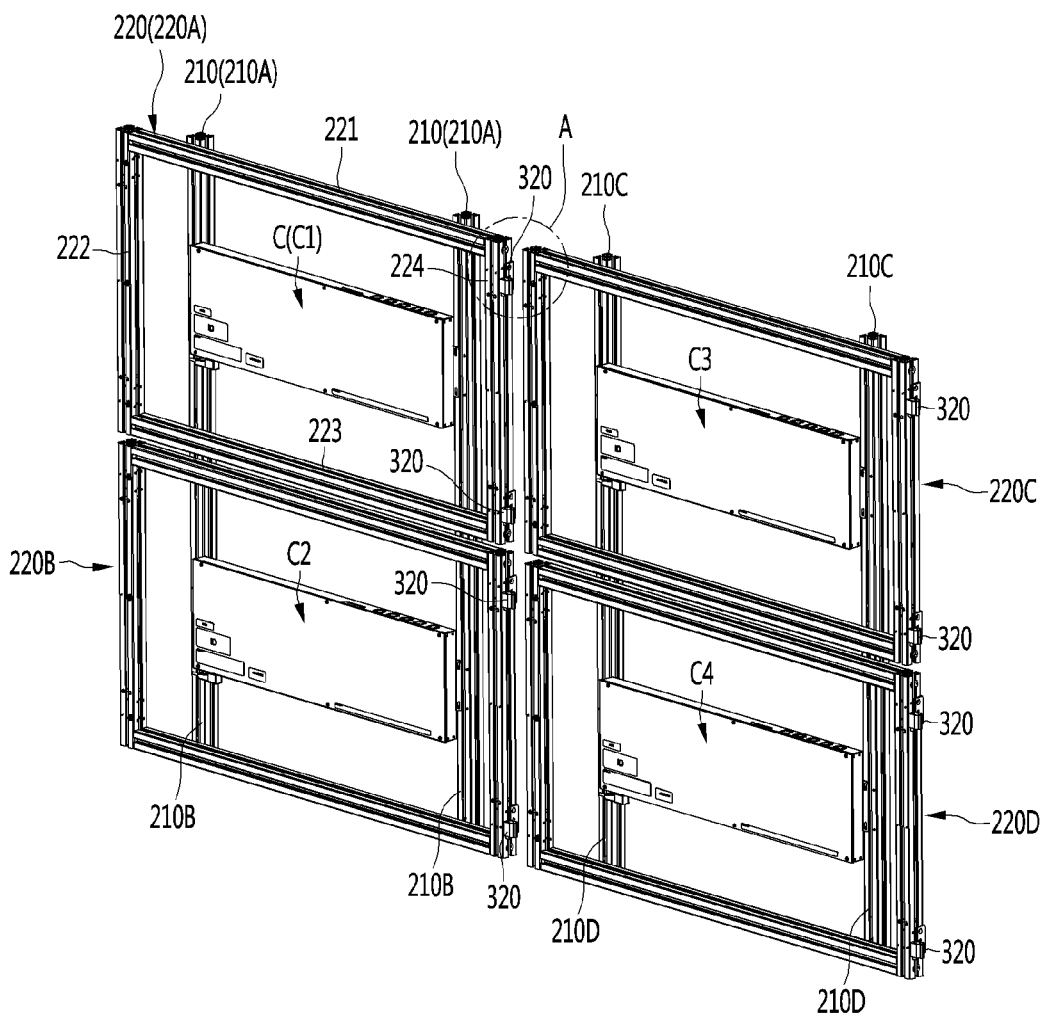

[Fig. 4]
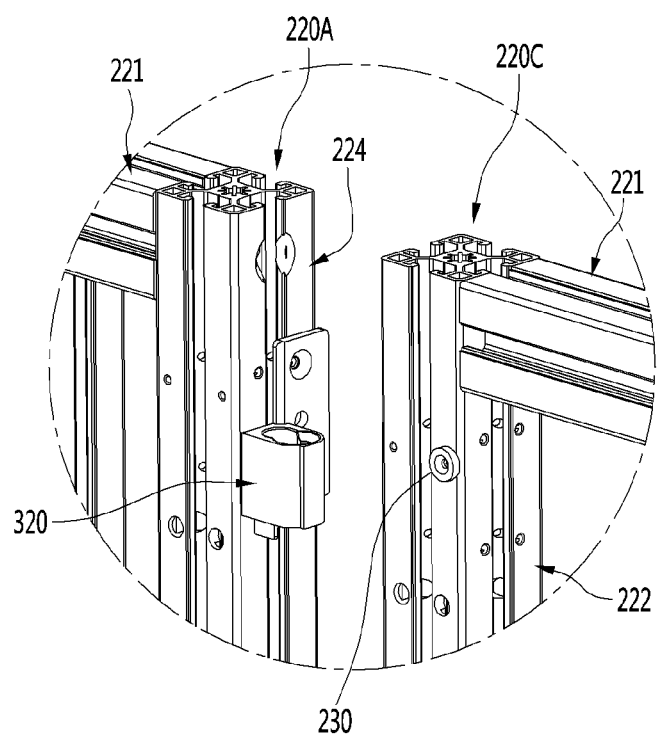

【Fig. 5】
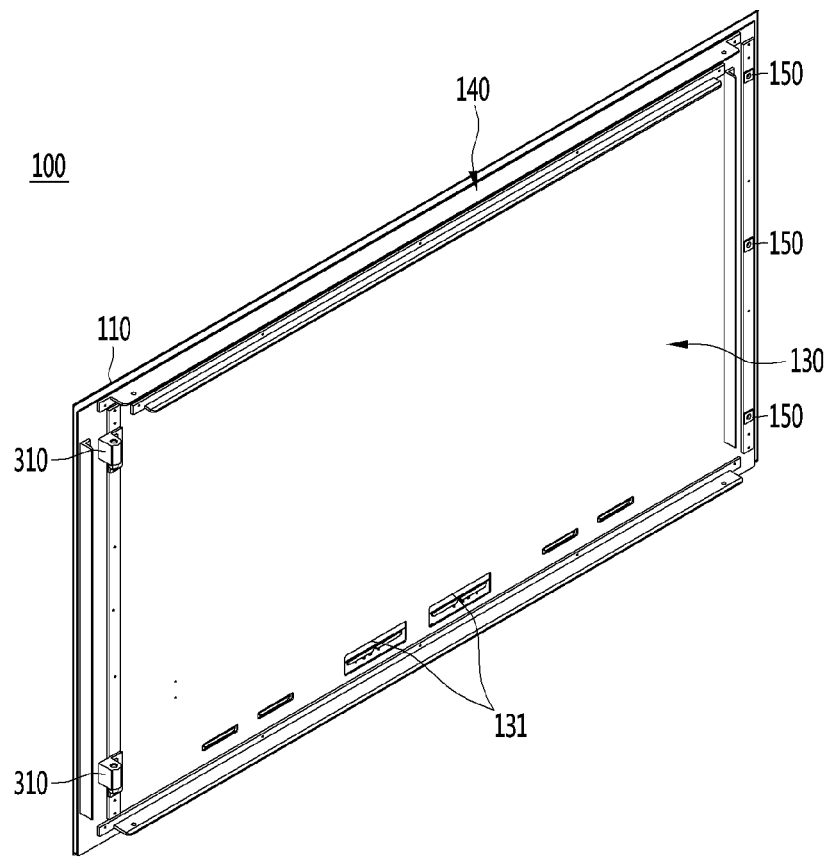

[Fig. 6]
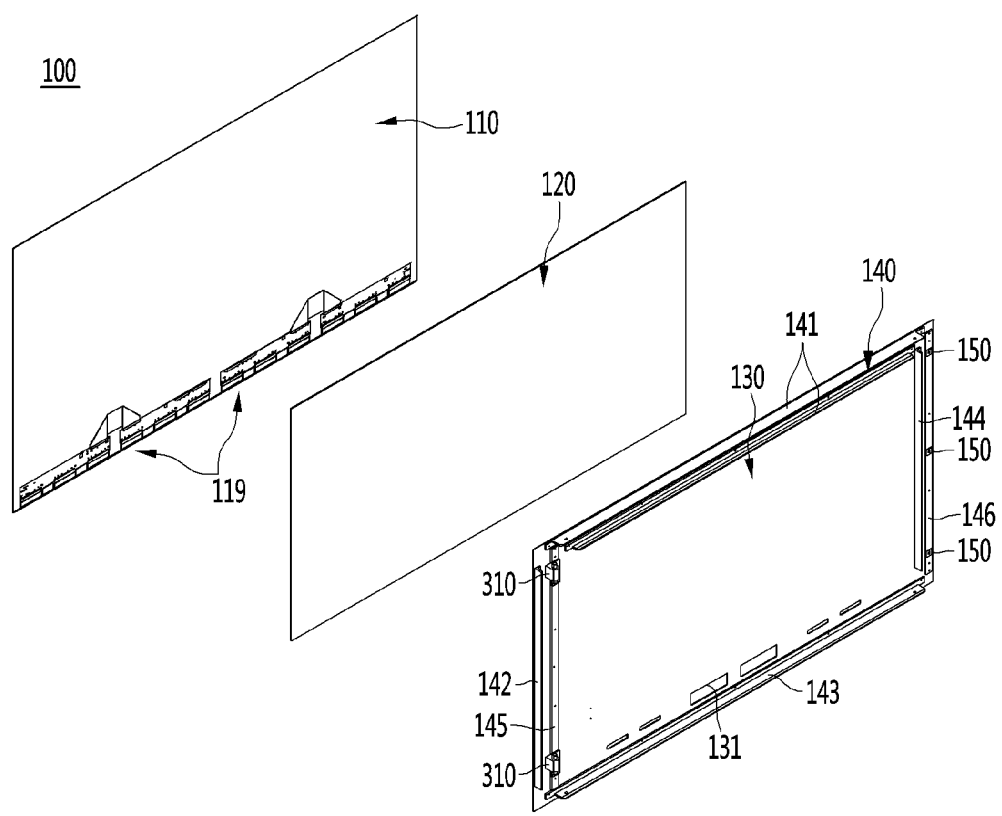

[Fig. 7]
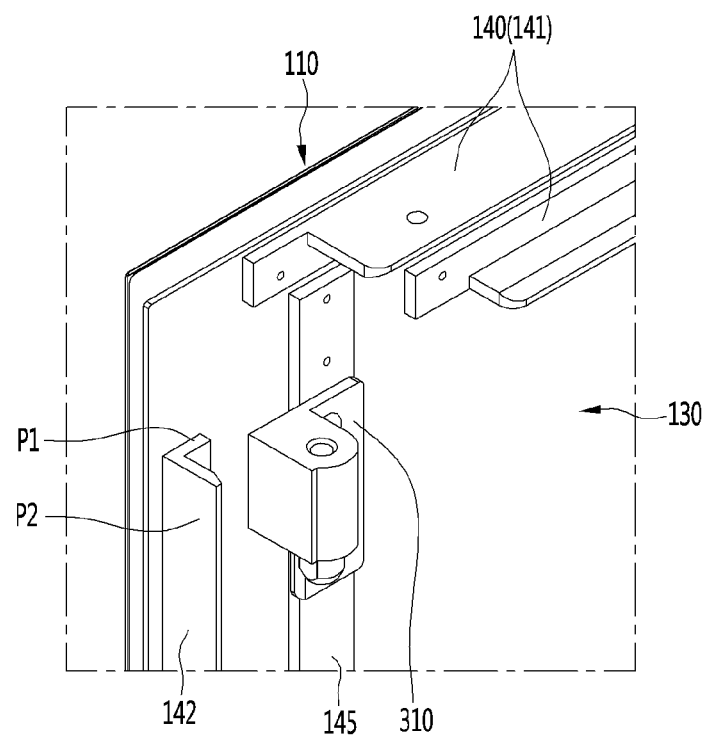

[Fig. 8]
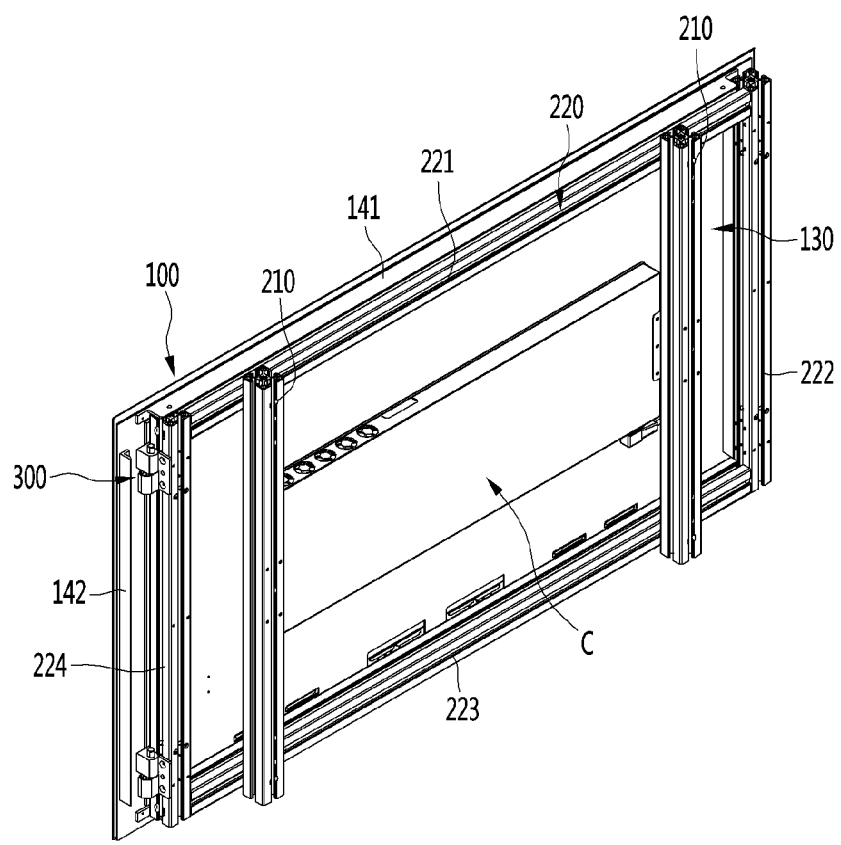

[Fig. 9]
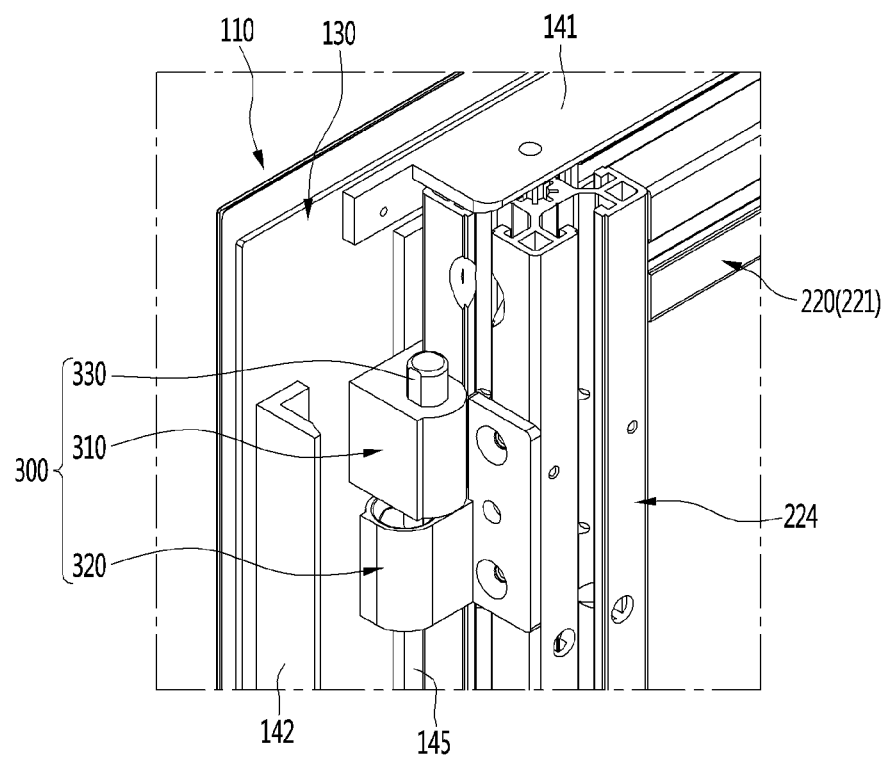

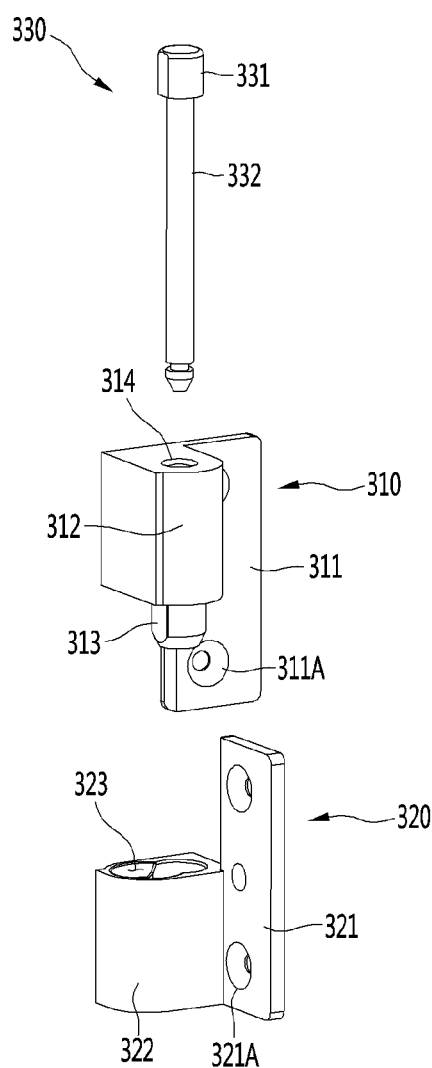
[Fig. 10]

[Fig. 11]
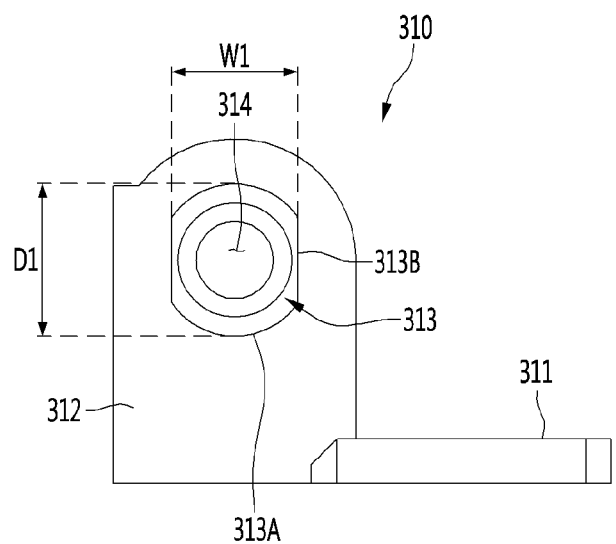

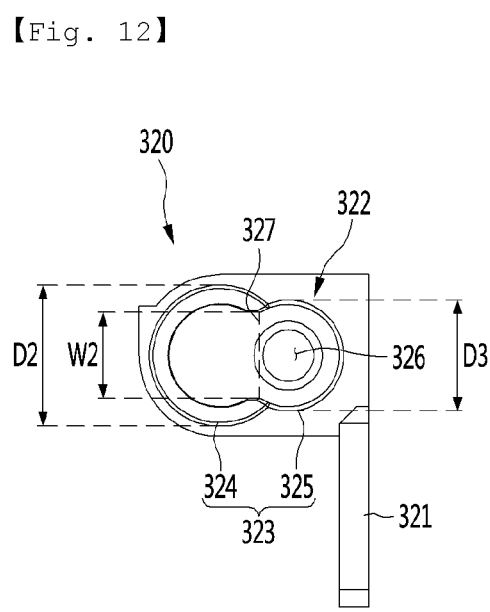
[Fig. 12]

[Fig. 13]
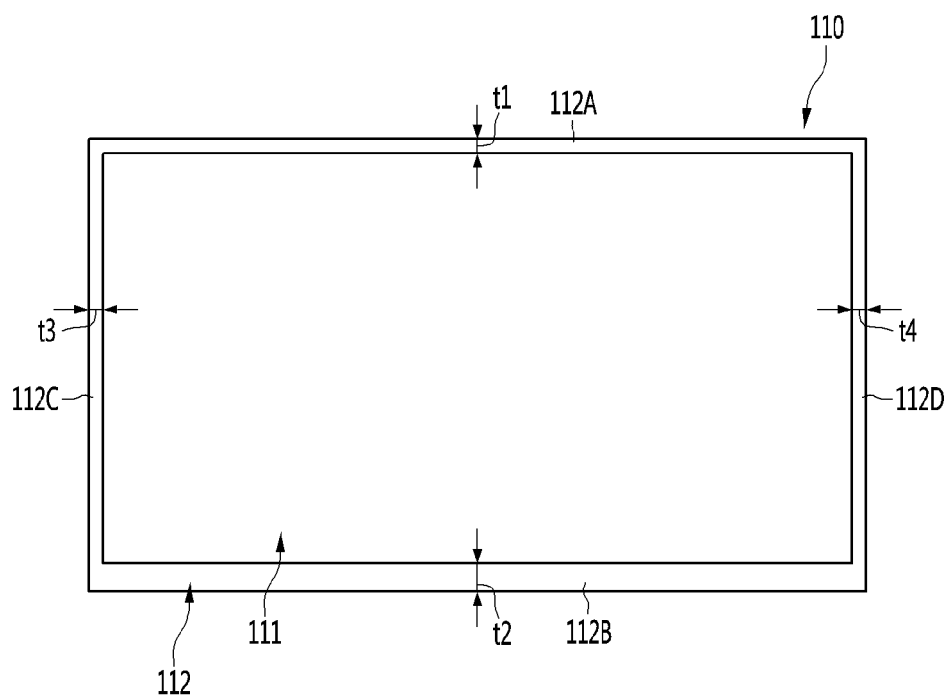

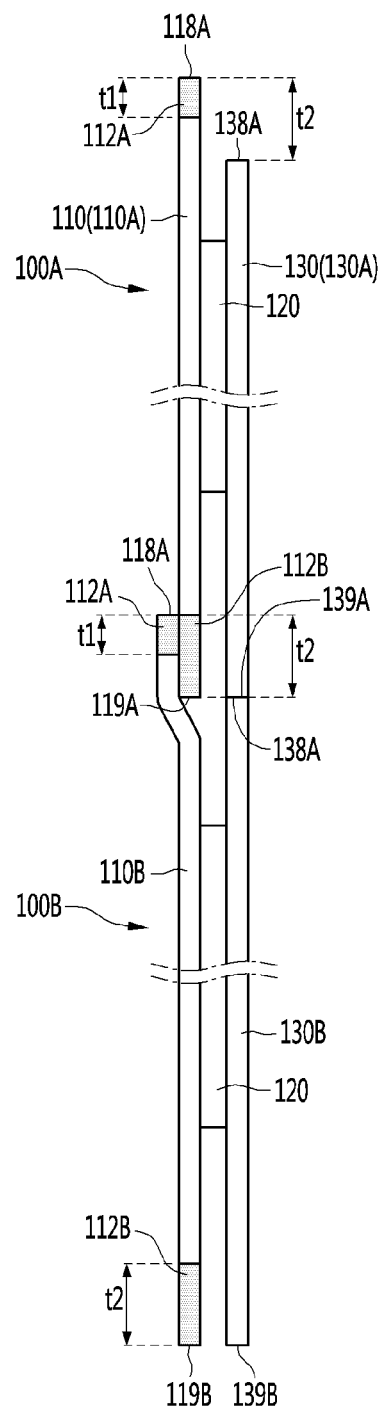
[Fig. 14]

[Fig. 15]
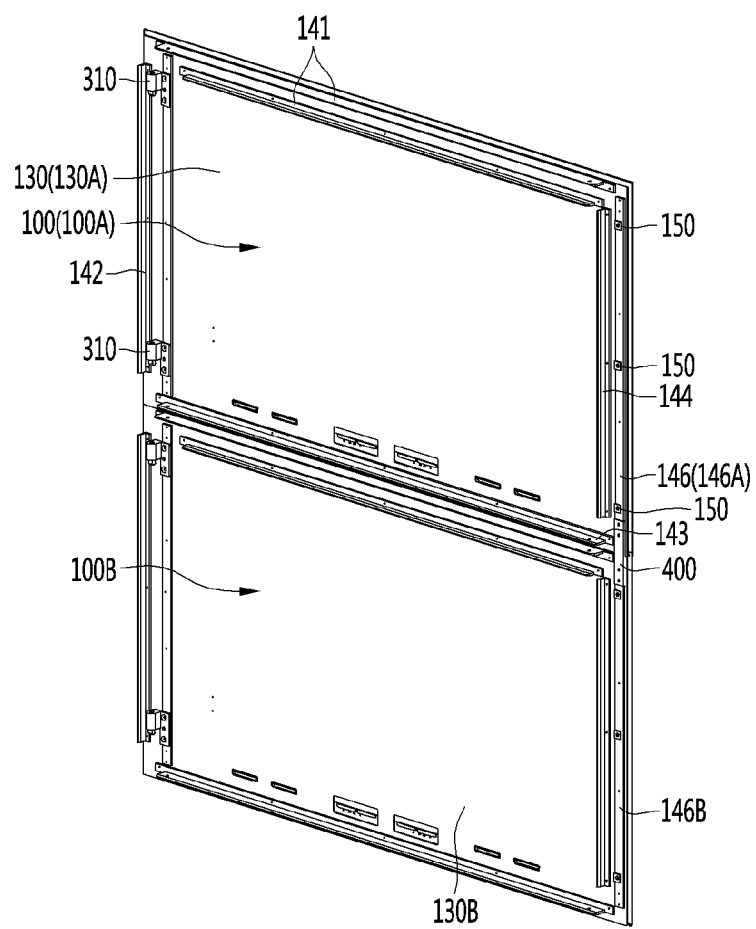

[Fig. 16]
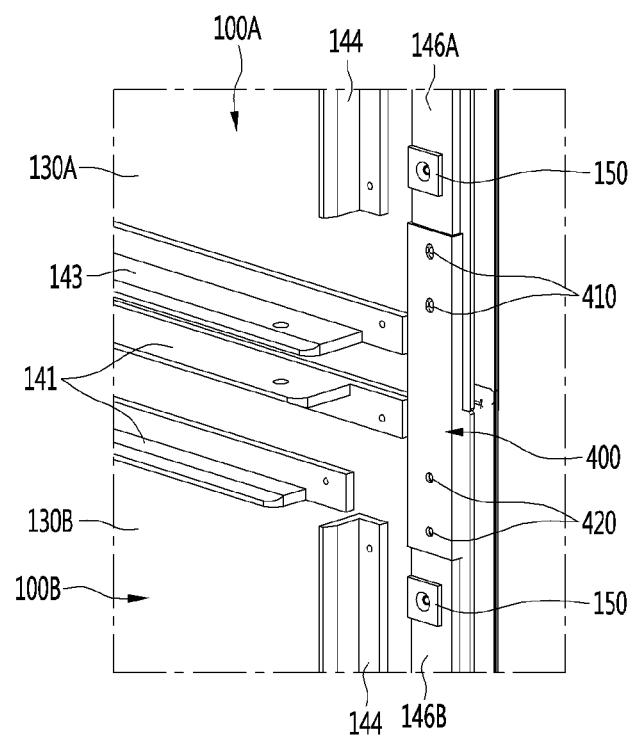

DISPLAY DEVICE

CROSS-REFERENCE TO RELATED APPLICATIONS

This application is the National Stage filing under 35 U.S.C. 371 of International Application No. PCT/KR2019/001072, filed on Jan. 25, 2019, the contents of which is incorporated by reference herein in its entirety.

TECHNICAL FIELD

The present invention relates to a display device, and more particularly, to a display device including one or more display modules.

BACKGROUND ART

As our information society develops, needs for diverse forms of display devices are increasing. Accordingly, research has been carried out on various display devices such as liquid crystal display devices (LCDs), plasma display panels (PDPs), electro luminescent displays (ELDs), vacuum fluorescent displays (VFDs), organic light emitting diodes (OLEDs), and the like.

Among them, such an OLED panel may display an image by depositing an organic material layer that is capable of emitting light by itself on a substrate on which a transparent electrode is formed. The OLED panel is not only thin, but also has flexible characteristics. Many studies have been conducted on structural characteristics of the display device having such an OLED panel.

DISCLOSURE OF THE INVENTION

Technical Problem

One object of the present invention is to provide a display device that is easy to be assembled.

Another object of the present invention is to provide a display device in which individual maintenance of display modules is easy.

Further another object of the present invention is to provide a display device in which a non-display area that is visible to a user is minimized.

Technical Solution

A display device according to an embodiment of the present invention may include: a display module; a support frame disposed behind the display module; and a hinge module configured to hinge-connect the display module to the support frame. The hinge module may include: a first fastening part fastened to the display module; a first body part connected to the first fastening part and protruding backward from the first fastening part; an insertion part protruding downward from the first body part; a second fastening part fastened to the support frame; a second body part connected to the second fastening part and protruding forward from the second fastening part; a first insertion groove which is recessed downward from a top surface of the second body part and into which the insertion part is rotatably inserted; and a second insertion groove which is configured to communicate with the first insertion groove and disposed at a side of the first insertion groove and into which the insertion part is rotatably inserted.

The hinge module may include: a first through-hole configured to vertically pass through the first body part and the insertion part; a second through-hole configured to pass downward from an inner bottom surface of the second insertion groove; and a hinge pin inserted into the first through-hole and the second through-hole.

The insertion part may have a first width in one direction and a second width greater than the first width in the other direction crossing the one direction.

The first insertion groove may have an inner diameter greater than an inner diameter of the second insertion groove, and a portion at which the first insertion groove and the second insertion groove communicate with each other may have a width less than the inner diameter of the second insertion groove.

The portion at which the first insertion groove and the second insertion groove communicate with each other may have a width greater than the first width and less than the second width.

The display device may further include: a magnet provided on a front surface of the support frame; and a magnetic body provided on a rear surface of the display module to apply attractive force by the magnet.

The hinge module may be connected to an edge of one side of the rear surface of the display module, and the magnetic body may be provided on an edge of the other side of the rear surface of the display module.

The display module may include: a display panel; a back plate disposed behind the display panel; a magnet plate disposed between the display panel and the back plate; and a plurality of reinforcing frames fastened to a rear surface of the back plate. At least a portion of the plurality of reinforcing frames may be in contact with the support frame.

An upper end of the display panel may be higher than an upper end of the back plate.

A lower end of the display panel may be disposed at the same height as a lower end of the back plate.

The display panel may include: a display area on which an image or picture is displayed; a first non-display area disposed above the display area; and a second non-display area disposed under the display area. A vertical width of the first non-display area may be less than a vertical width of the second non-display area.

A distance between an upper end of the display panel and an upper end of the back plate may be the same as the vertical width of the second non-display area.

A display device according to an embodiment of the present invention may include: a first display module; a second display module disposed under the first display module; a support frame disposed behind the first display module and the second display module; and a hinge module configured to hinge-connect each of the first display module and the second display module to the support frame. The hinge module may include: a first fastening part fastened to the first display module or the second display module; a first body part connected to the first fastening part and protruding backward from the first fastening part; an insertion part protruding downward from the first body part; a second fastening part fastened to the support frame; a second body part connected to the second fastening part and protruding forward from the second fastening part; a first insertion groove which is recessed downward from a top surface of the second body part and into which the insertion part is rotatably inserted; and a second insertion groove which is configured to communicate with the first insertion groove and disposed at a side of the first insertion groove and into which the insertion part is rotatably inserted.

The first display module may include: an upper display panel; and an upper back plate which is disposed behind the upper display panel and to which the hinge module is connected. The second display module may include: a lower display panel; and a lower back plate which is disposed behind the lower display panel and to which the hinge module is connected.

A portion of a lower side of the lower display panel may be configured to cover a portion of an upper side of the upper display panel at a front side.

At least one of the first display panel or the second display panel may be elastically deformed.

Each of the upper display panel and the lower display panel may include: a display area on which an image or picture is displayed; a first non-display area disposed above the display area; and a second non-display area disposed under the display area. A vertical width of the first non-display area may be less than a vertical width of the second non-display area.

The first non-display area of the lower display panel may be disposed in front of the second non-display area of the upper display panel.

A vertical distance between an upper end of the lower display panel and a lower end of the upper display panel may be the same as a vertical width of the second non-display area.

A lower end of the upper back plate and an upper end of the lower back plate may be in contact with each other The display device may further include a connector configured to connect the first display module to the second display module.

The hinge module may be connected to an edge of one side of a rear surface of each of the first display module and the second display module, and the connector may be fastened to an edge of the other side of the rear surface of each of the first display module and the second display module.

Advantageous Effects

According to a preferred embodiment of the present invention, each of the display modules may be individually fastened to and separated from the support frame. Accordingly, there is the advantage in that each of the display modules is individually maintained.

In addition, the worker may perform the assembly/disassembly operation in front of the display device. As a result, there is the advantage in that it is easy to allow the worker to perform the operation, and the additional operation space is unnecessary at the rear side of the display device.

In addition, the insertion part may be inserted into the first insertion groove to temporarily fix the display module to the support frame, and the insertion part may be inserted into the second insertion groove to allow the display module to be rotatably fastened to the support frame. Accordingly, during the assembly process of one display module, one display module that is temporarily fixed to the support frame may be prevented from being damaged by colliding with another display module that is rotatably fastened to the support frame.

In addition, a portion of the upper side of the lower display panel may cover a portion of the lower side of the upper display panel at the front side. As a result, the second non-display area disposed at the lower edge of the lower display panel may be covered, and the non-display area that is visible to the user may be minimized.

Also, the vertical distance between the upper end of the lower display panel and the lower end of the upper display panel may be the same as the vertical width of the second non-display area. Accordingly, it is possible to minimize the display area being covered.

In addition, since the first display module and the second display module are fastened by the connector, the first display module and the second display module may rotate together in the state of being aligned with each other. This may improve the reliability in assembly process.

In addition, the width of the portion at which the first insertion groove and the second insertion groove communicate with each other may be greater than the first width in one direction of the insertion part and may be smaller than the second width in the second direction crossing the one direction. Accordingly, there is an advantage that the insertion part reciprocates between the first insertion groove and the second insertion groove only when the display module rotates in the predetermined direction with respect to the support frame.

In addition, the second through-hole may be formed by passing downward from the inner bottom surface of the second insertion groove. Therefore, the hinge pin may be hinge-connected only when the insertion part is disposed in the second insertion groove. Therefore, the reliability in assembly may be further improved.

In addition, the display module may be easily fixed to or separated from the support frame by the magnet and the magnetic body.

In addition, at least a portion of the plurality of reinforcing frames may be in contact with the support frame. Therefore, the reinforcing frame may guide the installation position of the display module to the support frame as well as reinforce the display module.

BRIEF DESCRIPTION OF THE DRAWINGS

FIG. 1 is a view illustrating a state in which a display device is fixed to a structure according to an embodiment of the present invention.

FIG. 2 is a view for explaining mounting of a display module to a rear frame according to an embodiment of the present invention.

FIG. 3 is a perspective view of the rear frame and a control box according to an embodiment of the present invention.

FIG. 4 is an enlarged view of a portion "A" of FIG. 3.

FIG. 5 is a rear view of the display module according to an embodiment of the present invention FIG. 6 is an exploded perspective view of the display module according to an embodiment of the present invention.

FIG. 7 is an enlarged view of a module-side hinge body and a periphery of the module-side hinge body according to an embodiment of the present invention.

FIG. 8 is a rear view illustrating a state in which the display module is mounted on the rear frame according to an embodiment of the present invention.

FIG. 9 is an enlarged view of a hinge module and a periphery of the hinge module according to an embodiment of the present invention.

FIG. 10 is an exploded perspective view of the hinge module according to an embodiment of the present invention.

FIG. 11 is a bottom view of a first hinge body according to an embodiment of the present invention.

FIG. 12 is a plan view of a second hinge body according to an embodiment of the present invention.

FIG. 13 is a front view of the display panel according to an embodiment of the present invention.

FIG. 14 is a view for explaining a position relationship between a first display module and a second display module according to an embodiment of the present invention.

FIG. 15 is a rear view of the first display module and the second display module according to an embodiment of the present invention.

FIG. 16 is an enlarged view of a connector of FIG. 15 and a periphery of the connector.

MODE FOR CARRYING OUT THE INVENTION

Hereinafter, detailed embodiments will be described in detail with reference to the accompanying drawings.

FIG. 1 is a view illustrating a state in which a display device is fixed to a structure according to an embodiment of the present invention, FIG. 2 is a view for explaining mounting of a display module to a rear frame according to an embodiment of the present invention, and FIG. 3 is a perspective view of the rear frame and a control box according to an embodiment of the present invention.

A display device according to an embodiment of the present invention may include a display module 100 and rear frames 210 and 220 disposed behind the display module 100.

The display module 100 may output an image or a picture. The display module 100 may have an approximately rectangular shape, but is not limited thereto.

The display device according to an embodiment of the present invention may include at least one display module 100, preferably, include a plurality of display modules 100.

The plurality of display modules 100 may be disposed to form at least one row and at least one column.

For example, four display modules 100 may be provided, and the four display modules 100 may be disposed to form two rows and two columns (2*2). As another example, nine display modules 100 may be provided, and the nine display modules 100 may be disposed to form three rows and three columns (3*3). Hereinafter, as illustrated in FIG. 1, a case in which four display modules 100 are disposed to form two rows and two columns will be described as an example.

The plurality of display modules 100 may include a first display module 100A, a second display module 100B, a third display module 100C, and a fourth display module 100D.

When viewed from the front, the first display module 100A may be disposed at an upper left side. The second display module 100B may be disposed at a lower left side. The third display module 100C may be disposed at an upper right side. The fourth display module 100D may be disposed at a lower right side. That is, the first display module 100A may be disposed in a first row and a first column, the second display module 100B may be disposed in a second row and the first column, the third display module 100C may be disposed in the first row and a second columns, and the fourth display module 100D may be disposed in the second row and the second column.

The configuration and positional relationship of each of the display modules 100 will be described in more detail later.

The rear frames 210 and 220 may support the display module 100 and be fixed to a structure W such as a wall. The display module 100 may be rotatably connected to the rear frames 210 and 220, and the rear frames 210 and 220 may support the display module 100.

Each of the rear frames 210 and 220 may include a metal material, more particularly, an aluminum material AL. The rear frames 210 and 220 may include a plurality of bars fastened to each other.

The plurality of rear frames 210 and 220 may include a fixed frame 210 fixed to the structure W and a support frame 220 supporting the display module 100.

The fixed frame 210 may have a bar shape that is disposed to be vertically elongated. The fixed frame 210 may be provided in plurality, which are horizontally spaced apart from each other.

The fixed frame 210 may be fixed to the structure W such as the wall.

The fixed frame 210 may support the control box C. The control box C may be fastened to the fixed frame 210 in front of the fixed frame 210. The control box C may be disposed behind the display module 100. That is, the control box C may be disposed between the display module 100 and the structure W.

The control box C may be electrically connected to the display module 100. The control box C may control the image or the picture displayed on the display module 100. The control box C may include a main board, a power module, and a timing controller (T-con). Since an internal configuration of the control box C and a function of each of components are well-known technologies, detailed descriptions are omitted.

The support frame 220 may be fastened to the fixed frame 210 in front of the fixed frame 210.

The support frame 220 may have an approximately rectangular shape. In more detail, the support frame 220 may include an upper support frame 221, a left support frame 222, a lower support frame 223, and a right support frame 224.

Each of the upper support frame 221 and the lower support frame 223 may be formed to be horizontally elongated. Each of the left support frame 222 and the right support frame 224 may be formed to be vertically elongated.

The upper support frame 221 and the lower support frame 223 may be the same length. The left support frame 222 and the right support frame 224 may be the same length.

The lower support frame 223 may be spaced downward from the upper support frame 221.

The left support frame 222 may connect a left end of the upper support frame 221 to a left end of the lower support frame 223. The right support frame 224 may connect a right end of the upper support frame 221 to a right end of the lower support frame 223.

The display module 100 may be rotatably connected to the support frame 220 in front of the support frame 220. That is, the display module 100 and the support frame 220 may be hinge-connected to each other.

In more detail, at least one first hinge body 310 may be provided in the display module 100, and at least one second hinge body 320 hinge-connected to the first hinge body 310 may be provided in the support frame 220.

The first hinge body 310 may be provided on a rear surface of the display module 100. In more detail, the first hinge body 310 may be provided on one edge (e.g., a right edge) of the rear surface of the display module 100.

It is preferable that the first hinge body 310 is provided in plurality. The plurality of first hinge bodies 310 may be spaced apart from each other in a vertical direction and may be disposed in a vertical straight line.

The second hinge body 320 may be provided at one side of the support frame 220. In more detail, the second hinge body 320 may be provided on the left support frame 222 or the right support frame 224. FIG. 2 illustrates an example in which the first hinge body is provided on a right edge of the rear surface of the display module, and the second hinge body is provided with the right frame.

It is preferable that the second hinge body 320 is provided in plurality. The plurality of second hinge bodies 320 may be spaced apart from each other in the vertical direction and may be disposed in a vertical straight line.

The configuration and connection relationship of the first hinge body 310 and the second hinge body 320 will be described in detail later.

The overall shape and number of the rear frames 210 and 220 may vary according to the number and arrangement of the display modules 100. Hereinafter, as illustrated in FIG. 1, a case in which four display modules 100 are disposed to form two rows and two columns will be described as an example.

The plurality of fixed frames 210 may include a first fixed frame 210A, a second fixed frame 210B, a third fixed frame 210C, and a fourth fixed frame 210D. Also, the plurality of support frames 220 may include a first support frame 220A, a second support frame 220B, a third support frame 220C, and a fourth support frame 220D. Also, the plurality of control boxes C may include a first control box C1, a second control box C2, a third control box C3, and a fourth control box C4.

The first display module 100A and the first support frame 220A may be hinge-connected to each other, and the first support frame 220A may support the first display module 100A. The first control box C1 may be disposed behind the first display module 100A and may control the first display module 100A. The first fixed frame 210A may support the first control box C1.

The second display module 100B and the second support frame 220B may be hinged-connected to each other, and the second support frame 220B may support the second display module 100B. The second control box C2 may be disposed behind the second display module 100B and may control the second display module 100B. The second fixed frame 210B may support the second control box C2.

The third display module 100C and the third support frame 220C may be hinge-connected to each other, and the third support frame 220C may support the third display module 100C. The third control box C3 may be disposed behind the third display module 100C and may control the third display module 100C. The third fixed frame 210C may support the third control box C3.

The fourth display module 100D and the fourth support frame 220D may be hinge-connected to each other, and the fourth support frame 220D may support the fourth display module 100D. The fourth control box C4 may be disposed behind the fourth display module 100D and may control the fourth display module 100D. The fourth fixed frame 210D may support the fourth control box C4.

FIG. 4 is an enlarged view of a portion "A" of FIG. 3.

Referring to FIGS. 1 to 3 together with FIG. 4, the second hinge body 320 may be provided on one of the left support frame 222 and the right support frame 224, and a magnet 230 may be provided on the other of the left support frame 222 and the right support frame 224.

Hereinafter, a case in which the first hinge body 320 is provided on the right support frame 224, and the magnet 230 is provided on the left support frame 222 will be described as an example.

The second hinge body 320 may be provided on an outer surface, that is, a right surface of the right support frame 224. The second hinge body 320 may be hinge-connected to the first hinge body 310 provided on the rear surface of the display module 100.

Thus, a worker may connect the display module 100 to the support frame 220 in front of the structure W and the support frame 220. Accordingly, when compared to a case in which the connection operation of the display module 100 is performed behind the structure W and the support frame 220, the worker may easily perform the connection operation. Also, there is an advantage that an operation space is unnecessary behind the structure W and the support frame 220.

The magnet 230 may be provided on a front surface of the left support frame 222. The magnet 230 is preferably provided in plurality that are vertically spaced apart from each other.

One side (e.g., right side) of the display module 100 may be hinge-connected to the support frame 220, and the other side (e.g., left side) of the display module 100 may be fixed to the support frame 220 by magnetic force of the magnet 230.

The magnet 230 may adhere to the magnetic body 150 (see FIG. 5) provided on the rear surface of the display module 100. That is, attractive force may act between the magnet 230 and the magnetic body 150. Accordingly, the display module 100 may be simply fixed to the support frame 220.

FIG. 5 is a rear view of the display module according to an embodiment of the present invention, FIG. 6 is an exploded perspective view of the display module according to an embodiment of the present invention, FIG. 7 is an enlarged view of a module-side hinge body and a periphery of the module-side hinge body according to an embodiment of the present invention, and FIG. 8 is a rear view illustrating a state in which the display module is mounted on the rear frame according to an embodiment of the present invention.

The display module 100 may include a display panel 110, a magnet plate 120, and a back plate 130.

It is preferable that the display panel 110 is an organic light emitting diode (OLED) panel.

The display panel 110 may have a substantially rectangular shape. The display panel 110 may form a front surface of the display module 100.

An image or picture may be displayed on the display panel 110. A panel substrate 119 may be provided under a rear surface of the display panel 110, and the panel substrate 119 may be electrically connected to the control box C.

The magnet plate 120 may be disposed between the display panel 110 and the back plate 130. The magnet plate 120 may fix the display panel 110 to the back plate 130.

The magnet plate 120 may include a magnet. In this case, a magnetic panel (not shown) may be provided on a front surface of the back plate 130 to attract each other by magnetic force between the magnet plate 120 and the magnet plate 120. The magnetic panel may include a magnet or a magnetic material. However, the back plate itself may include a material having magnetism without allowing a separate magnetic panel to be provided on the back plate 130.

Also, the magnet plate 120 may adhere to the display panel 110 by an adhesive member such as an adhesive or an adhesive film. The magnet plate 120 may adhere to an upper side of the panel substrate 119 on the rear surfaces of the display panel 110.

That is, the magnet plate 120 may adhere to the back plate 130 by the magnetic force while adhering to the display panel 110. Accordingly, the fastening of the display panel 110 and the back plate 130 may be facilitated.

The back plate 130 may have an approximately rectangular shape. The back plate 130 may form the rear surface of the display module 100. The back plate 130 may include a metal material such as aluminum.

At least one reinforcing frame 140 may be provided on the rear surface of the back plate 130. The reinforcing frame 140 may be fastened to the back plate 130 by a fastening member such as a screw, but is not limited thereto.

At least one opening 131 may be formed in the back plate 130. In more detail, the opening 131 may be formed by passing through a lower portion of the back plate 130 forward and backward. The opening 131 may face the panel substrate 119 provided on the rear surface of the display panel 110. The cable or chip-on film (CoF) may pass through the opening 131 to connect the control box C disposed behind the back plate 130 to the panel substrate 119 disposed in front of the back plate 130.

The display module 110 may further include at least one reinforcing frame 140.

The reinforcing frame 140 may be fastened to the rear surface of the back plate 130. In more detail, the reinforcing frame 140 may be fastened to an edge of the rear surface of the back plate 130 or a portion adjacent to the edge of the rear surface.

The reinforcing frame 140 may reinforce rigidity of the back plate 130. The reinforcing frame 140 may include a metal material such as aluminum.

It is preferable that the reinforcing frame 140 is provided in plurality. The reinforcing frame 140 may be bent at least once. A cross-section of the reinforcing frame 140 may have an approximately "]" shape. In more detail, the reinforcing frame 140 may include a first part P1 fastened to the back plate 130 and a second part P2 bent backward from an edge of the first part P1. Accordingly, the reinforcing frame 140 may more effectively reinforce the rigidity of the back plate 130.

It is preferable that the reinforcing frame 140 is provided in plurality. In more detail, the plurality of reinforcing frames 140 may include an upper frame 141, a right frame 142, a lower frame 143, and a left frame 144. In this case, a left and right direction is based on a case in which the display module 110 is viewed from the front side.

The upper frame 141, the right frame 142, the lower frame 143, and the left frame 144 may be disposed to be adjacent to an upper edge, a right edge, a lower edge, and a left edge of the back plate 130, respectively.

The upper frame 141 and the lower frame 143 may be lengthily disposed horizontally. The right frame 142 and the left frame 144 may be elongated vertically.

At least a portion of the reinforcing frames 140 may be in contact with the support frame 220 described above. In more detail, at least one of the upper frame 141, the right frame 142, the lower frame 143, and the left frame 144 may be contact with the support frame 220.

Hereinafter, as illustrated in FIG. 6, a case in which the upper frame 141, the lower frame 143, and the left frame 144 are in contact with the support frame 220, and the right frame 142 is spaced apart from the support frame 220 will be described an example.

The upper frame 141 may be in contact with the upper support frame 221. The lower frame may be in contact with the lower support frame 223. The left frame 144 may be in contact with the left support frame 222.

The second part P2 of each of the upper frame 141, the lower frame 143, and the left frame 144 may be hooked and restricted by the support frame 220. Also, the second part P2 of each of the upper frame 141, the lower frame 143, and the left frame 144 may be fastened to the support frame 220.

In more detail, the second part P2 of each of the upper frame 141 and the lower frame 142 may be hooked on the upper support frame 221 in at least one direction of an upward direction and a downward direction. The second part P2 of the left frame 144 may be hooked on the left support frame 222 in at least one direction of a left direction and a right direction.

Accordingly, the reinforcing frame 140 may guide a mounted position of the display module 100 with respect to the support frame 220. Also, the reinforcing frame 140 may restrict the display module 100 in the vertical and in the left and right direction.

The display module 110 may further include a hinge mounting frame 145 and a magnetic body mounting frame 146.

The hinge mounting frame 145 and the magnetic body mounting frame 146 may be fastened to the rear surface of the back plate 130.

The hinge mounting frame 145 and the magnetic body mounting frame 146 may be disposed to be elongated vertically. The hinge mounting frame 145 and the magnetic body mounting frame 146 may be horizontally spaced apart from each other.

In more detail, the hinge mounting frame 145 may be mounted on a portion adjacent to one edge (e.g., right edge) of the rear surface of the back plate 130, and the magnetic body mounting frame 146 may be mounted on a portion adjacent to the other edge (e.g., left edge) of the rear surface of the back plate 130.

At least one first hinge body 310 may be mounted on the hinge mounting frame 145. The number and position of the first hinge bodies 310 may correspond to the number and positions of the second hinge bodies 320 (see FIG. 2) mounted on the support frame 220. For example, a pair of first hinge bodies 310 may be mounted on upper and lower portions of the hinge mounting frame 145, respectively.

The first hinge body 310 may be fastened behind the hinge mounting frame 145 by a fastening member such as a screw. The first hinge body 310 fastened to the hinge mounting frame 145 may be hinge-connected to the second hinge body 320 (see FIG. 2) mounted on the support frame 220.

At least one magnetic body 150 may be mounted on the magnetic body mounting frame 146. The number and position of the magnetic body 150 may correspond to the number and position of the magnets 230 (see FIG. 4) mounted on the support frame 220. For example, three magnetic bodies 150 may be mounted on upper, intermediate, and lower portions of the magnetic body mounting frame 146, respectively.

The magnetic body 150 may be fastened behind the magnetic body mounting frame 146 by a fastening member such as a screw. The magnetic body 150 mounted on the magnetic body mounting frame 146 may apply an attractive force by magnetic force to the magnet 230 (see FIG. 4) mounted on the support frame 220.

FIG. 9 is an enlarged view of a hinge module and a periphery of the hinge module according to an embodiment of the present invention, FIG. 10 is an exploded perspective view of the hinge module according to an embodiment of the present invention, FIG. 11 is a bottom view of a first hinge body according to an embodiment of the present invention, and FIG. 12 is a plan view of a second hinge body according to an embodiment of the present invention.

The display device according to an embodiment of the present invention may further include a hinge module 300. The hinge module 300 may rotatably connect the display module 10 to the support frame 220.

In more detail, the hinge module 300 may include a first hinge body 310 mounted on the display module 10, a second hinge body 320 mounted on the support frame 220, and a hinge pin 330 connecting the first hinge body 310 to the second hinge body 320.

The first hinge body 310 may include a first fastening part 311, a first body part 312, and an insertion part 313.

The first fastening part 311 may be fastened to the display module 100, more particularly, the hinge mounting frame 145. In more detail, at least one fastening hole 311A may be formed in the first fastening part 311, and the fastening member such as the screw may pass through the fastening hole 311A to be fastened to the hinge mounting frame 145.

The first body part 312 may be integrally formed with the first fastening part 311. The first body part 312 may be connected to an edge of the first fastening part 311 and may protrude backward than the first fastening part 311. The first body part 312 may have an approximately block shape.

The insertion part 313 may be formed to protrude downward from a bottom surface of the first body part 312. The insertion part 313 may be formed to be stepped from the bottom surface of the first body part 312. The insertion part 313 may be inserted into an insertion groove 323 of the second hinge body 320 to be described later.

As illustrated in FIG. 11, an outer circumference of the insertion part 313 may include a pair of curved surfaces 313A and a pair of flat surfaces 313B. The curved surface 313A and the flat surface 313B may be alternately disposed in a circumferential direction of the insertion part 313. Each of the pair of curved surfaces 313A may have a constant curvature. That is, the outer circumference of the insertion part 313 may have a shape in which both sides of the cylindrical outer circumference are cut to be flat.

A width W1 of the insertion part 313 in one direction may be less than a width D1 of the insertion part 313 in the other direction crossing the one direction. That is, the insertion part 313 may have the first width W1 in one direction and the second width D1 greater than the first width W1 in the other direction crossing the one direction. The second width D1 may mean an outer diameter D1 of the insertion part 313.

In more detail, the outer diameter D1 of the insertion part 313 may be larger than the width W1 of the insertion part 313. In this case, the outer diameter D1 of the insertion part 313 may mean a maximum distance between the pair of curved surfaces 313A. In addition, the width W1 of the insertion part 313 may mean a distance between the pair of flat surfaces 313B.

A first through-hole 314 may be formed in each of the first body part 312 and the insertion part 313. The hinge pin 330 may be inserted into the first through-hole 314. The first through-hole 314 may vertically pass from an upper end of the first body part 312 to a lower end of the insertion part 313.

The second hinge body 320 may include a second fastening part 321, a second body part 312, and an insertion groove 323.

The second fastening part 321 may be fastened to the support frame 220, more particularly, any one of the left support frame 222 and the right support frame 224. For example, the second fastening part 321 may be fastened to a right surface of the right support frame 224.

In more detail, at least one fastening hole 321A may be formed in the second fastening part 321, and the fastening member such as the screw may pass through the fastening hole 321A to be fastened to the support frame 220.

The second body part 322 may be integrally formed with the second fastening part 321. The second body part 322 may be connected to an edge of the second fastening part 321 and protrude forward from the second fastening part 321. The second body part 322 may have an approximately block shape.

The insertion groove 323 may be formed by being recessed downward from a top surface of the second body part 322. The insertion groove 323 may be formed to be stepped from the top surface of the second body part 322. The insertion groove 323 may be inserted into the insertion part 313 of the first hinge body 310.

When the insertion part 313 is inserted into the insertion groove 323, the bottom surface of the first body part 312 and the top surface of the second body part 322 may be in contact with each other.

As illustrated in FIG. 12, the insertion groove 323 may include a first insertion groove 324 and a second insertion groove 325, which communicates with the first insertion groove 324.

An inner bottom surface of the first insertion groove 324 and an inner bottom surface of the second insertion groove 325 may be connected without being stepped.

An inner diameter D3 of the second insertion groove 325 may be less than an inner diameter D2 of the first insertion groove 324. In addition, a width W2 of a virtual boundary 327, which is a portion at which the first insertion groove 324 and the second insertion groove 325 communicate with each other, may be less than an inner diameter D3 of the second insertion groove 325.

An inner diameter D2 of the first insertion groove 324 may be greater than an outer diameter D1 of the insertion part 313. Accordingly, the insertion part 313 may be easily inserted into the first insertion groove 324. In addition, the insertion part 313 may rotate while being inserted into the first insertion groove 324.

A width of the virtual boundary 327 may be less than the outer diameter D1 of the insertion part 313 and may be greater than or equal to the width W1 of the insertion part 313. Therefore, only when the first hinge body 310 rotates in a predetermined direction with respect to the second hinge body 320, the insertion part 313 may reciprocate between the first insertion groove 324 and the second insertion groove 325.

For example, when the display module 100 is disposed to be elongated in the left and right direction, like the first and second display modules 100A and 100B illustrated in FIG. 2, the insertion part 313 may not move from the first insertion groove 324 to the second insertion groove 325. On the other hand, when the display module 100 is disposed to be elongated in the front and rear direction, like the third and fourth display modules 100C and 100D illustrated in FIG. 2, the insertion part 313 may move from the first insertion groove 324 to the second insertion groove 325.

An inner diameter D3 of the second insertion groove 325 may be the same as or slightly greater than the outer diameter D1 of the insertion part 313. In more detail, a tolerance in which the insertion part 313 is rotatable within the second insertion groove 325 may be formed between the outer diameter D1 of the insertion part 313 and the inner diameter D3 of the second insertion groove 325. Accordingly, the insertion part 313 may rotate while being inserted into the second insertion groove 325.

The second insertion groove 325 may be disposed at a side (left or right sides) of the first insertion groove 324.

The second insertion groove 325 may be closer to the support frame 220 when compared to the first insertion groove 324. That is, a distance from the support frame 220 to the second insertion groove 325 may be less than a distance from the support frame 220 to the first insertion groove 324.

A second through-hole 326 may be formed in the second insertion groove 325. The hinge pin 330 may be inserted into the second through-hole 326. The second through-hole 326 may vertically pass from an inner bottom surface of the second insertion groove 325 to a bottom surface of the second body part 322.

When the insertion part 313 is disposed in the first insertion groove 324, the first through-hole 314 and the second through-hole 326 may be parallel to each other. That is, when the insertion part 313 is disposed in the first insertion groove 324, the first through-hole 314 and the second through-hole 326 may not be disposed in a straight line.

On the other hand, when the insertion part 313 is disposed in the second insertion groove 325, the first through-hole 314 and the second through-hole 326 may be disposed in the straight line with each other. Therefore, when the insertion part 313 is disposed in the second insertion groove 325, the hinge pin 330 may sequentially pass through the first through-hole 314 and the second through-hole 326 to hinge-connect the first hinge body 310 to the second hinge body 320.

The hinge pin 330 may include a head portion 331 and a pin portion 332 disposed under the head portion 331.

The head portion 331 may be hooked on the top surface of the first body part 311 of the first hinge body 310 to prevent the hinge pin 330 from being separated downward.

The pin portion 332 may extend downward from the head portion 331. A portion of the pin portion 332 may be disposed in the first through-hole 314, and the portion may be disposed in the second through-hole 326.

A hook groove may be formed in a lower end of the pin portion 332. In this case, a locking member (not shown) to which the hook groove is hooked and fixed may be provided under the second hinge body 320.

Hereinafter, a method for mounting the display module 100 on the support frame 220 will be described.

The worker may mount the display module 100 on the support frame in front of the support frame 220. In this case, like the third and fourth display modules 100C and 100D illustrated in FIG. 2, the worker may insert the insertion part 313 of the first hinge body 310 into the first insertion groove 324 of the second hinge body 320 in a state in which the display module 100 is disposed to be elongated in the front and rear direction. When the insertion part 313 is inserted into the first insertion groove 324, the display module 100 may be temporarily fixed to the support frame 220.

The worker may move the temporarily fixed display module 100 to move the insertion part 313 from the first insertion groove 324 to the second insertion groove 325. Thereafter, the worker may insert the hinge pin 330 into the first through-hole 314 and the second through-hole 326. Accordingly, the display module 100 may be rotatably fastened to the support frame 220.

Thereafter, the worker may rotate the display module 100 so that the front surface of the display module 100 faces a front side, like the first and second display modules 100A and 100B illustrated in FIG. 2. In this case, the magnetic body 150 (see FIG. 5) provided on the rear surface of the display module 100 may adhere to the magnet 230 (see FIG. 4) provided on the front surface of the support frame 220 by the magnetic force.

FIG. 13 is a front view of the display panel according to an embodiment of the present invention and FIG. 14 is a view for explaining a position relationship between the first display module and the second display module according to an embodiment of the present invention.

The display panel 110 may include a display area 111 on which an image or picture is displayed, and a non-display area 112 disposed around the display area 111.

The non-display area 112 may be a black matrix.

The non-display area 112 may include a first non-display area 112A disposed above the display area 111, a second non-display area 112B disposed under the display area 111, a third non-display area 112C disposed at a left side of the display area 111, and a fourth non-display area 112D disposed at a right side of the display area 111.

A vertical width t1 of the first non-display area 112A, a horizontal width t3 of the third non-display area 112C, and a horizontal width t4 of the fourth non-display area 112D may be the same. A vertical width t2 of the second non-display area 112B may be larger than the vertical width t1 of the first non-display area 112A. This may be due to a fact that the panel substrate 119 (see FIG. 6) is provided under the display panel 110.

In order to minimize the non-display area 112, a portion of an upper side of the display panel 110 of the display module 100B disposed at a lower side may cover the second non-display area 112B of the display panel 110 of the display module 100A, which is disposed at an upper side.

Hereinafter, a positional relationship between the display modules 100, which are disposed vertically, will be described with reference to the first display module 100A and the second display module 100B as an example.

The first display module 100A may be disposed above the second display module 100B.

Hereinafter, the display panel 110 and the back plate 130 of the first display module 100A are referred to as an upper display panel 110A and an upper back plate 130A, respectively. Also, the display panel 110 and the back plate 130 of the second display module 100B are referred to as a lower display panel 110B and a lower back plate 130B, respectively.

A portion of a lower side of the upper display panel 110A may overlap a portion of an upper side of the lower display panel 110B in the front and rear direction. In more detail, a portion of the lower side of the upper display panel 110A may cover a portion of the upper side of the lower display panel 110B at the front side.

The upper display panel 110A and the lower display panel 110B may be in contact with each other.

Each of the upper display panel 110A and the lower display panel 110B may be thin and flexible. Accordingly, at least one of the upper display panel 110A or the lower display panel 110B may be elastically deformed. In more detail, at least one of a portion of a lower side of the upper display panel 110A and a portion of an upper side of the lower display panel 110B may be elastically deformed.

In more detail, a portion of the lower side of the lower display panel 110B may cover the second non-display area 112B of the upper display panel 110A at the front side. That is, the first non-display area 112A of the lower display panel 110B may be disposed in front of the second non-display area 112B of the upper display panel 110A.

Accordingly, when the user looks at the display device from the front side, the first non-display area 112A of the lower display panel 110B may be visible, and the second non-display area 112B of the upper display panel 110A may not be visible. As described above, the vertical width t2 of the second non-display area 112B may be greater than the vertical width t1 of the first non-display area 112A. As a result, the non-display area 112 that is visible to the user may be minimized.

In order to satisfy the positional relationship as described above, an upper end of the display panel 110 may be higher than an upper end of the back plate 130. That is, the upper end of the display panel 110 may be disposed above a horizontal plane passing through the upper end of the back plate 130.

A lower end of the display panel 110 may be disposed at the same height as a lower end of the back plate 130. That is, the lower end of the display panel 110 and the lower end of the back plate 130 may be disposed on the same horizontal plane.

Also, a vertical distance between the upper end of the display panel 110 and the upper end of the back plate 130 may be the same as the width t2 of the second non-display area 112B.

In more detail, a vertical distance between the upper end 118A of the upper display panel 110A and the upper end 138A of the upper back plate 130A may be the same as the width t2 of the second non-display area 112B.

The vertical distance between the upper end 118B of the lower display panel 110B and the upper end 138B of the lower back plate 130B may be the same as the width t2 of the second non-display area 112B.

The lower end 139A of the upper back plate 130A and the upper end 138B of the lower back plate 130B may be in contact with each other.

Accordingly, the vertical distance between the lower end 119A of the upper display panel 110A and the upper end 118B of the lower display panel 110B may be the same as the vertical width t2 of the second non-display area 112B.

FIG. 15 is a rear view of the first display module and the second display module according to an embodiment of the present invention, and FIG. 16 is an enlarged view of a connector of FIG. 15 and a periphery of the connector.

The display device according to an embodiment of the present invention may further include a connector 400. The connector 400 may connect the upper back plate 130A and the lower back plate 130B to each other.

The connector 400 may have a vertical bar shape, but is not limited thereto.

The connector 400 may be provided on the rear surface of the back plate 130. In more detail, when the first hinge body 310 is disposed at one side of the rear surface of the back plate 130, the connector 400 may be disposed at the other side of the rear surface of the back plate 130.

The connector 400 may be fastened to each of the magnetic body mounting frame 146 provided on the upper back plate 130A and the magnetic body mounting frame 146 provided on the lower back plate 130B. Hereinafter, the magnetic body mounting frame 146 provided on the upper back plate 130A is referred to as an upper magnetic body mounting frame 146A, and the magnetic body mounting frame 146 provided on the lower back plate 130B is referred to as a lower magnetic body mounting frame 146B.

The connector 400 may have at least one upper fastening hole 410 fastened to the upper magnetic body mounting frame 146A and at least one lower fastening hole 420 fastened to the lower magnetic material mounting frame 146B.

The fastening member such as the screw may pass through the upper fastening hole 410 and be fastened to the upper magnetic body mounting frame 146A. Similarly, the fastening member such as the screw may pass through the lower fastening hole 420 and be fastened to the lower magnetic body mounting frame 146B.

There is an advantage that the first display module 100A and the second display module 100B are rotatable together by the hinge module 300 through the connector 400.

Hereinafter, a method of assembling the display device will be described with reference to the first display module 100A and the second display module 100B as an example. The first display module 100A may be disposed above the second display module 100B.

A method of assembling the display device may include: a first temporary fixing process of temporarily fixing a first display module 100A to a first supporting frame 220A, a first fastening process of rotatably fastening the first display module 100A to the first support frame 220A, a second temporary fixing process of temporarily fixing the second display module 100B to the second support frame 220B, a second fastening process of rotatably fastening the second display module 100B to the second support frame 220B, a connecting process of connecting the first display module 100A and the second display module 100B to the connector 400, and a rotating process of rotating the first display module 100A and the second display module 100B.

In the first temporary fixing process, the worker may mount the first display module 100A on the first support frame 220A in front of the first support frame 220A (see FIG. 2). In this case, like the third and fourth display modules 100C and 100D illustrated in FIG. 2, the worker may insert the insertion part 313 (see FIG. 10) of the first hinge body 310 into the first insertion groove 324 (see FIG. 11) of the second hinge body 320 in a state in which the first display module 100A is disposed to be elongated in the front and rear direction. When the insertion part 313 is inserted into the first insertion groove 324, the display module 100 may be temporarily fixed to the first support frame 220A.

In the first fastening process, the worker may move the temporarily fixed first display module 100A to move the insertion part 313 from the first insertion groove 324 to the second insertion groove 325. Thereafter, the worker may insert the hinge pin 330 into the first through-hole 314 and the second through-hole 326. Accordingly, the first display module 100A may be rotatably fastened to the first support frame 220A.

In the second temporary fixing process, the worker may mount the second display module 100B on the second support frame 220B in front of the second support frame 220B (see FIG. 2). In this case, like the third and fourth display modules 100C and 100D illustrated in FIG. 2, the worker may insert the insertion part 313 (see FIG. 10) of the first hinge body 310 into the first insertion groove 324 (see FIG. 11) of the second hinge body 320 in a state in which the second display module 100B is disposed to be elongated in the front and rear direction. When the insertion part 313 is inserted into the first insertion groove 324, the display module 100 may be temporarily fixed to the first support frame 220A.

Since the second display module 100B is temporarily fixed in the state in which the first display module 100A is fastened, the upper display panel 110A and the lower display panel 110B may be spaced apart from each other in the second temporary fixing process. Accordingly, it is possible to prevent the upper display panel 110A and the lower display panel 110B from colliding with each other in the assembly process and minimize a risk of damage of the display panel 110.

In the first fastening process, the worker may move the temporarily fixed second display module 100B to move the insertion part 313 from the first insertion groove 324 to the second insertion groove 325. Thereafter, the worker may insert the hinge pin 330 into the first through-hole 314 and the second through-hole 326. Accordingly, the second display module 100B may be rotatably fastened to the second support frame 220B.

In the connecting process, the worker may connect the first display module 100A to the second display module 100B through the connector 400 in a state of aligning the first display module 100A with the second display module 100B. In this case, a portion of a lower side of the lower display panel 110B may overlap the second non-display area 112B of the upper display panel 110A.

In the rotation process, the worker may rotate the first and second display modules 100A and 100B so that front surfaces of the first and second display modules 100A and 100B face a front side. Since the first display module 100A and the second display module 100B are connected through the connector 400, the first display module 100A and the second display module 100B may rotate together.

The magnetic body 150 (see FIG. 5) provided on the rear surface of each of the first and second display modules 100A and 100B may adhere to the magnet 230 (see FIG. 4) provided on the front surface of the support frame 220 by the magnetic force. Therefore, the assembly of the display device may be completed.

The separation operation of the display device may be the reverse of the assembly operation. Accordingly, the worker may individually separate each of the display modules 100 from the support frame 220. Therefore, maintenance of each of the display modules 100 may be facilitated.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

What is claimed is:

1. A display device comprising:
a display module;
wherein the display module comprises:
a display panel; and
a back plate disposed behind the display panel,
wherein the display panel comprises:
a display area on which an image or picture is displayed;
a first non-display area disposed above the display area; and
a second non-display area disposed under the display area, and
wherein a distance between an upper end of the display panel and an upper end of the back plate is same as a vertical width of the second non-display area.

2. The display device according to claim 1, further comprising:
a support frame disposed behind the display module; and
a hinge module configured to hinge-connect the display module to the support frame,
wherein the hinge module comprises:
a first fastening part fastened to the display module;
a first body part connected to the first fastening part and protruding backward from the first fastening part;
an insertion part protruding downward from the first body part;
a second fastening part fastened to the support frame;
a second body part connected to the second fastening part and protruding forward from the second fastening part;
a first insertion groove which is recessed downward from a top surface of the second body part and into which the insertion part is rotatably inserted; and
a second insertion groove which is configured to communicate with the first insertion groove and disposed at a side of the first insertion groove and into which the insertion part is rotatably inserted, and
wherein the hinge module further comprises:
a first through-hole configured to vertically pass through the first body part and the insertion part;
a second through-hole configured to pass downward from an inner bottom surface of the second insertion groove; and
a hinge pin inserted into the first through-hole and the second through-hole.

3. The display device according to claim 1, further comprising:
a support frame disposed behind the display module; and
a hinge module configured to hinge-connect the display module to the support frame,
wherein the hinge module comprises:
a first fastening part fastened to the display module;
a first body part connected to the first fastening part and protruding backward from the first fastening part;
an insertion part protruding downward from the first body part;
a second fastening part fastened to the support frame;
a second body part connected to the second fastening part and protruding forward from the second fastening part;
a first insertion groove which is recessed downward from a top surface of the second body part and into which the insertion part is rotatably inserted; and
a second insertion groove which is configured to communicate with the first insertion groove and disposed at a side of the first insertion groove and into which the insertion part is rotatably inserted, and
wherein the insertion part has a first width in one direction and a second width greater than the first width in the other direction crossing the one direction.

4. The display device according to claim 3, wherein the first insertion groove has an inner diameter greater than an inner diameter of the second insertion groove, and
a portion at which the first insertion groove and the second insertion groove communicate with each other has a width less than the inner diameter of the second insertion groove.

5. The display device according to claim 4, wherein the portion at which the first insertion groove and the second insertion groove communicate with each other has a width greater than the first width and less than the second width.

6. The display device according to claim 1, further comprising:
a support frame disposed behind the display module;
a hinge module configured to hinge-connect the display module to the support frame;
a magnet provided on a front surface of the support frame; and
a magnetic body provided on a rear surface of the display module to apply attractive force by the magnet.

7. The display device according to claim 6, wherein the hinge module is connected to an edge of one side of the rear surface of the display module, and
the magnetic body is provided on an edge of the other side of the rear surface of the display module.

8. The display device according to claim 1, wherein the display module further comprises:
a magnet plate disposed between the display panel and the back plate; and
a plurality of reinforcing frames fastened to a rear surface of the back plate,
wherein at least a portion of the plurality of reinforcing frames is in contact with the support frame.

9. The display device according to claim 1, wherein an upper end of the display panel is higher than an upper end of the back plate.

10. The display device according to claim 1, wherein a lower end of the display panel is disposed at a same height as a lower end of the back plate.

11. The display device according to claim 8,
wherein a vertical width of the first non-display area is less than the vertical width of the second non-display area.

12. A display device comprising:
a first display module; and
a second display module disposed under the first display module,
wherein the first display module comprises an upper display panel,
wherein the second display module comprises a lower display panel,
wherein each of the upper display panel and the lower display panel comprises:
a display area on which an image or picture is displayed;
a first non-display area disposed above the display area; and
a second non-display area disposed under the display area, and
wherein the first non-display area of the lower display panel is disposed in front of the second non-display area of the upper display panel.

13. The display device according to claim 12, further comprising:
a support frame disposed behind the first display module and the second display module; and
a hinge module configured to hinge-connect each of the first display module and the second display module to the support frame,
wherein the first display module further comprises:
an upper back plate which is disposed behind the upper display panel and to which the hinge module is connected,
wherein the second display module further comprises:
a lower back plate which is disposed behind the lower display panel and to which the hinge module is connected.

14. The display device according to claim 12, wherein a portion of an upper side of the lower display panel is configured to cover a portion of a lower side of the upper display panel at a front side.

15. The display device according to claim 12, wherein at least one of the upper display panel or the lower display panel is elastically deformed.

16. The display device according to claim 12,
wherein a vertical width of the first non-display area is less than a vertical width of the second non-display area.

17. The display device according to claim 12, wherein a vertical distance between an upper end of the lower display panel and a lower end of the upper display panel is same as a vertical width of the second non-display area.

18. The display device according to claim 13, wherein a lower end of the upper back plate and an upper end of the lower back plate are in contact with each other.

19. The display device according to claim 12, further comprising a connector configured to connect the first display module to the second display module.

20. The display device according to claim 19, further comprising:
a support frame disposed behind the first display module and the second display module; and
a hinge module configured to hinge-connect each of the first display module and the second display module to the support frame,
wherein the hinge module comprises:
a first fastening part fastened to the first display module or the second display module;
a first body part connected to the first fastening part and protruding backward from the first fastening part;
an insertion part protruding downward from the first body part;
a second fastening part fastened to the support frame;
a second body part connected to the second fastening part and protruding forward from the second fastening part;
a first insertion groove which is recessed downward from a top surface of the second body part and into which the insertion part is rotatably inserted; and
a second insertion groove which is configured to communicate with the first insertion groove and disposed at a side of the first insertion groove and into which the insertion part is rotatably inserted,
wherein the hinge module is connected to an edge of one side of a rear surface of each of the first display module and the second display module, and
the connector is fastened to an edge of the other side of the rear surface of each of the first display module and the second display module.

* * * * *